(12) United States Patent  (10) Patent No.: US 7,853,519 B2
Lipton et al.  (45) Date of Patent: *Dec. 14, 2010

(54) SYSTEMS AND METHODS FOR MODELING CREDIT RISKS OF PUBLICLY TRADED COMPANIES

(75) Inventors: Alexander Lipton, Chicago, IL (US); Jonathan Z. Song, New York, NY (US); Shinghoi Lee, New York, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 1028 days.

This patent is subject to a terminal disclaimer.

(21) Appl. No.: 11/543,599

(22) Filed: Oct. 5, 2006

(65) Prior Publication Data

US 2007/0027786 A1  Feb. 1, 2007

Related U.S. Application Data

(60) Division of application No. 10/795,541, filed on Mar. 8, 2004, now Pat. No. 7,236,951, which is a continuation of application No. 10/626,077, filed on Jul. 24, 2003, now abandoned.

(51) Int. Cl.
  *G06Q 40/00* (2006.01)
(52) U.S. Cl. ...................................................... 705/38
(58) Field of Classification Search ........................ None
  See application file for complete search history.

(56) References Cited

U.S. PATENT DOCUMENTS

| | | | |
|---|---|---|---|
| 6,078,903 A | 6/2000 | Kealhofer | |
| 6,085,175 A | 7/2000 | Gugel et al. | |
| 6,112,190 A | 8/2000 | Fletcher et al. | |
| 6,493,682 B1 | 12/2002 | Horrigan et al. | |
| 7,236,951 B2 | 6/2007 | Lipton et al. | |
| 2004/0225598 A1* | 11/2004 | Goldberg et al. | 705/38 |
| 2005/0021452 A1 | 1/2005 | Lipton et al. | |

FOREIGN PATENT DOCUMENTS

| | | |
|---|---|---|
| WO | WO 01/52121 | 7/2001 |
| WO | WO 2006/010722 | 2/2006 |

OTHER PUBLICATIONS

"International Search Report", PCT/US2004/23720, (Dec. 29, 2005),10 pages.

Finkelstein, Valdimir , et al., "Credit Grades Technical Document", RiskMetrics Group, Inc.,(May 2002),1-52.

(Continued)

*Primary Examiner*—Jason M Borlinghaus
(74) *Attorney, Agent, or Firm*—King & Spalding LLP

(57) ABSTRACT

There are provided new structural default models for modeling the likely default of publicly traded companies. In a first embodiment, the invention is straight-forward to implement and allows the capture of some important ingredients of the actual default, including positive short-term CDSs. In a second embodiment them model is somewhat more versatile and complex. Provided is a very efficient method for dealing with the timing of a default boundary, that is, jumps in the company's value, etc. Further provided is a process using Fast Fourier Transform matrix processing for processing the structural default models in a computationally efficient manner.

15 Claims, 2 Drawing Sheets

OTHER PUBLICATIONS

Hull, John, "Merton's Model, Credit Risk and Volatility Skews", *Research Paper; Internet*, (Feb. 25, 2003),1-23.

Merton, R. C., "Option Pricing when Underlying Stock Returns are Discontinuous", *WP 787-75, Academic Paper presented at American Finance Association*, Dec. 1975, Masachusetts Institute of Technology.,(Apr. 1997),1-25.

Zhou, Chunsheng, "A Jump-Diffusion Approach to Modeling Credit Risk and Valuing Defaultable Securities", *Research Paper; Internet*, Federal Reserve Board (Washington DC),(Mar. 1997),1-47.

Office Action mailed Apr. 6, 2005 for U.S. Appl. No. 10/795,541.

Office Action mailed Aug. 26, 2005 for U.S. Appl. No. 10/795,541.

Notice of Allowance mailed Jun. 7, 2006 for U.S. Appl. No. 10/795,541.

* cited by examiner

SYSTEMS AND METHODS FOR MODELING CREDIT RISKS OF PUBLICLY TRADED COMPANIES

RELATED APPLICATIONS

This application is a divisional of U.S. patent application Ser. No. 10/795,541 filed Mar. 8, 2004, allowed, which is a continuation of U.S. patent application Ser. No. 10/626,077 filed Jul. 24, 2003, abandoned, each of which is incorporated herein in its entirety.

FIELD OF THE INVENTION

The present invention relates to methods and systems for modeling risk and more particularly to methods and systems for modeling credit risks of publicly traded companies.

BACKGROUND OF THE INVENTION

Evaluating and managing credit risks with respect to publicly traded companies are important capabilities for financial service providers. Credit risk analysis is used to evaluate a multitude of daily-occurring financial transactions including, for example: the origination of bank loans, the buying and selling of bonds, transactions in the credit derivatives market, the extension of payment to customers, portfolio development and management and portfolio valuation.

The use of Black-Scholes-based analysis tools to estimate credit risk is known in the art. The well known Black-Scholes algorithm uses as inputs values relating to a particular publicly-traded stock, values relating to the financial market as whole and values relating to a proposed stock option in order to calculate a strike price for an option on the particular stock.

With particular changes to the input variables and the formula of the Black-Scholes algorithm, Robert Merton proposed one of the earliest and simplest default credit models. Merton's model regards the equity in a company as an option on the assets with a strike price equal to the face value of the debt. Merton assumed that the value of the company is governed by a risk-neutralized lognormal stochastic differential equation (SDE) of the form:

$$\frac{dV}{V} = rdt + \sigma dW \tag{1}$$

Here V is the value of the company, r is the risk neutral rate, σ is the company's volatility, and W is the standard Wiener process, the well-know building block continuous-time stochastic process for constructing random models over continuous time wherein: W(t) for t≧0, with, W(0)=0 and such that the increment W(t)−W(s) is Gaussian with mean 0 and variance t−s for any 0≦s<t, and increments for non-overlapping time intervals are independent. Merton chose (somewhat arbitrarily) some maturity T and assumed that the company defaults provided that, at maturity, the company value is below the level of its debt D. In the case of no default, at maturity equity holders receive the excess amount of S=V−D, while debt holders receive the debt amount of D. In the case of default, equity holders receive nothing, while debt holders receive the amount of V. Thus, Merton views equity as the call option on the value of the company struck at its debt level, and debt as straight bond minus the put option on its value struck at the same level. As a result, the value of the company is the sum of its equity and debt.

The actual calculations in the Merton model are straightforward. For finding the value of equity and debt, we can use the usual Black-Scholes formulas:

$$S = VN(d_+) - e^{-rT}DN(d_-) \tag{2}$$

$$\delta = VN(-d^+) + e^{-rT}DN(d_-) \tag{3}$$

$$d_\pm = [\ln(V/D) + (r \pm \sigma^2/2)T]/\sigma\sqrt{T} \tag{4}$$

wherein:
V: Value of the company
D: Debt at maturity.
r: Risk free interest rate.
σ: Standard deviation of the underlying asset, eg value of the company.
t: Intermediate time between today (t=0) and maturity (t=T).
T: Maturity date.
S: Stock price, or equity
δ: Current debt value
Survival probability Q(t) is defined only for t=T:

$$Q(T) = N(d_-) \tag{5}$$

Here N(.) is the cumulative normal distribution. Equity option with maturity $0<T_1<T$ and strike K can be priced as a compound option, and the corresponding equity volatility $\sigma_s$ be determined by inverting the Black-Scholes formula. As a rule, Merton's model is calibrated to the market by choosing V and σ in such a way that the corresponding S and $\sigma_s$ are matched exactly.

Using Merton's model in equation (1) above with the equity and debt values calculated using the Black-Scholes formulae (2), (3), (4), and (5), the probability of default is estimated from the market value of the equity, the face value of the debt and the volatility of the equity. The model is thus used to calculate an estimate of the likelihood of financial failure of a publicly traded company that is whether the debt position of a company will overrun its equity position, resulting in a financial failure.

Several commercial providers, including, for example, Moody-KMV, use Merton's model. Merton's model has obvious attractions because of its simplicity and intuitive character, but it does not address a number of very important questions, for instance, how to price bonds with different maturities in a consistent fashion. Merton's model further suffers from some fundamental mathematical inaccuracies relating to the default event. In particular, Merton's model inherently contemplates small changes, or 'random walks' in values from a starting point to a finishing point, i.e. from the current financial position of a publicly traded stock to a subsequent financial failure. The algorithm does not accommodate the large, random jumps often experienced in the marketplace. Further, the algorithm as initially set out contemplated "European style" option analysis, wherein options were exercised on a specified forward date. Merton's model does not contemplate a default before the due date. In practice, actions associated with financial failure can occur as a result of a single large event or a random walk on any given day. The reader is directed to the Internet websites www.moodyskmv.com/about/index.html, and www.moodyskmv.com/products/index.html, for publicly available information on the KMV credit risk analysis products and services.

At a later date, H. E. Leland modified Morton's model to restructure the description of a default event, thereby contemplating earlier default dates than the due date of the debt.

Leland's extension of Merton's model assumes that the value of the company is governed by the standard risk-neutralized log-normal SDE, but that default happens whenever the value of the company falls below a certain continuously monitored constant barrier level LD, where L is the relative level of company's liabilities, or at maturity T when the value of the company falls below D. Leland uses the standard formulas for barrier options on lognormal assets in order to find the value of equity S, debt $\delta$, and survival probabilities Q(t), Q(T):

$$S = VN(d_+) - e^{-rT}DN(d_-) - V(LD/V)^{2r/\sigma^2+1}N(f_+) + e^{-rT}D(LD/V)^{2r/\sigma^2-1}N(f_-) \quad (6)$$

$$\delta = VN(-d_+) + e^{-rT}DN(d_-) + V(LD/V)^{2r/\sigma^2+1}N(f_+) - e^{-rT}D(LD/V)^{2r/\sigma^2-1}N(f_-) \quad (7)$$

$$f_\pm = [\ln(L^2D/V) + (r\pm\sigma^2/2)T]/\sigma\sqrt{T} \quad (8)$$

$$Q(t) = N(g_+) - (LD/V)^{2r/\sigma^2}N(g_-), \ t<T \quad (9)$$

$$g_\pm = [\pm\ln(V/LD) + (r-\sigma^2/2)t]/\sigma\sqrt{t} \quad (10)$$

$$Q(T) = N(d_-) - (LD/V)^{2r/\sigma^2-1}N(f_-) \quad (11)$$

where $d_\pm$ are defined by equation (4) and the remaining variables are as defined above.

Leland's model is rich enough for the user to be able to find the Credit Default Spread (CDS), i.e., the extra discount value provided for risky bonds as compared to non-risky bonds:

$$CDS(t) = (1-R)\left(\frac{1-e^{-rt}Q(t)}{\int_0^t e^{-rt'}Q(t')dt'} - r\right) \quad (12)$$

where R is the recovery level for a particular debt seniority. While for medium and long maturities this spread is broadly comparable with the market, for short maturities it is very low, in sharp contrast with reality.

To rectify the above-mentioned problem, Credit Grades, a joint venture between JP Morgan, Deutsche Bank, and Goldman Sacks, proposed to make the recovery level L a normal random variable with the expected value of $\overline{L}$ and volatility $\overline{\omega}$. By doing so, they effectively replaced the calendar time t with the "shifted" time $\zeta = t + \overline{\omega}^2/\sigma^2$ and hence replaced the expression for the survival probability described above in equation (9) with the following:

$$Q(t) = N(\hat{g}_+) - (LD/V)^{2r/\sigma^2}N(\hat{g}), \ t<T \quad (13)$$

$$\hat{g}_\pm = [\pm\ln(V/LD) + (r-\sigma^2/2)\zeta]/\sigma\sqrt{\zeta} \quad (14)$$

As a result, they managed to increase the short-term CDSs, which still is given by equation (12). However, the model suffered in that it implicitly assumes that the value of the company can be below its default level from the very beginning, which, in the overwhelming majority of cases, is not true. Also, due to the approximate character of this formula, the initial survival probability Q(0) is less than one, which is mathematically (and financially) impossible. For further publicly available information the reader is directed to the Internet web page www.creditgrades.com/intro/intro.

In the later 1990's C. A. Zhou developed a jump-diffusion process, under which a company could default instantaneously because of a sudden drop in its value. The Zhou process was an extension of Leland's model, and addressed the issue of low CDSs in a more direct way. Zhou assumed that the value of the company is governed by an SDE with jumps:

$$\frac{dV}{V} = (r-\lambda\kappa)dt + \sigma dW + (e^J - 1)dN \quad (15)$$

Here N is the standard Poisson process with intensity $\lambda$, J is the lognormal jump size, which is assumed to be a random variable with a known probability density function $\phi(J)$, and $\kappa$ is the expected value of the jump size, $\kappa = \int_{-\infty}^{\infty}(e^J-1)\phi(J)dJ$. All other values are as defined above.

As in Leland's framework, default occurs if V(t) crosses the barrier LD, or, alternatively, if V(T)<D. The value of the company's equity S and its debt $\delta$ are computed by solving pricing problems for the corresponding barrier options. Due to the possibility of the company's value jumping down, CDSs for short maturities are significant. The key drawback of Zhou's model is its computational complexity. Also, its treatment of the recovery is somewhat ad hoc. It is very well known that barrier pricing problems for jump diffusions are very complicated. Zhou solves them via a Monte Carlo (MC) method. While MC methods are versatile, they are inaccurate and slow. Zhou's jump-diffusion model can match the size of credit spreads on corporate bonds and can generate various shapes of yield spread curves and marginal default rate curves, including upward-sloping, downward-sloping, at, and hump-shaped, even if the company is currently in good financial standing. The Zhou model also links recovery rates to company value at default in a natural way so that variation in recovery rates is endogenously generated in the model Despite the improvements to the Merton's model offered by Leland and then Zhou, significant challenges relating to accuracy and operability exist with today's credit risk models. The present inventors believe that even with the Leland and Zhou improvements, the likelihood and timing of default is not accurately modeled. Further, many implementations of the various models are very difficult to program and execute on a computer.

Commercially available credit risk models exist which attempt to compensate for some of the deficiencies of described above.

The credit underlying securities pricing model, CUSP®, available from Credit Suisse First Boston™, is another commercially available credit risk model. CUSP® is an analytical model that relates an issuer's capital structure, stock price and the option implied volatility of its shares to credit risk. CUSP® provides systematic monitoring of credit risk from forward-looking, market-based measures (One Standard Deviation Spread Widening Risk (SWR)) and relative value tracking which incorporates both risk and return (Probability Weighted Return (PWR)). For further publicly available information, the reader is directed to the Internet website website www.csfb.com/institutional/research/cusp.shtml.

While useful for estimating credit risks, the present inventors believe that the currently available algorithms and commercial models of the type described above still include inaccuracies in modeling both the random walks and the larger jumps experienced in the marketplace, as noted above. The more accurately such processes can be modeled, the higher the validity of a credit risk analysis tool. Not only is it desirable to accurately model such activities, but also the model itself must be able to be implemented, for example in a spreadsheet or other computer program, so as to practically operable.

SUMMARY OF THE INVENTION

In accordance with one aspect of the invention, the present inventors have developed a credit risk model that accurately incorporates the random walk and larger jump events actually experienced in the marketplace.

In accordance with another aspect of the invention, the present inventors have developed a methodology of solving the improved credit risk model that is readily implemented on a computer in spreadsheet or other digital program formats.

There are shown and described new structural default models for modeling the likely default of publicly traded companies. In a first embodiment, the invention is straight-forward to implement and allows the capture of some important ingredients of the actual default, including positive short-term CDSs. This first embodiment can be viewed as a hybrid between a structural and a reduced form model. A second embodiment is somewhat more versatile and complex. It provides a very efficient method, which is by far superior to the Monte Carlo method, for dealing with the term structure of a default boundary, jumps in the company's value, etc. This second embodiment enables the deep analysis of the term structure of the debt obligations of a given company, and the company's ability to pay back its debt. Further provided is a process using Fast Fourier Transform matrix processing for processing the structural default models in a computationally efficient manner.

In the first embodiment, methods and systems are provided for calculating the financial status of a company, the method comprising the steps of:

calculating the company's value in accordance with the formula $$\frac{dV}{V} = (r+\lambda)dt + \sigma dW - dN$$

wherein
V is the value of the company,
r is the risk neutral rate,
$\lambda$ is the intensity of jump arrivals,
$\sigma$ is the company's volatility,
N is the standard Poisson process,
W is the standard Wiener process,
and t is a time between 0 and T, the maturity of the debt; and using the company value to calculate a financial metric for the company.

In the second embodiment, methods and systems are provided for calculating the financial status of a company, the method comprising the steps of: calculating the value over time of a company in accordance with Zhou's model; determining that the company defaults if at a sequence of discrete observational times the value of the company falls below a corresponding barrier level, the barrier levels selected to represent different debt amounts which come due at corresponding times; and calculating the transitional probability density function for the value of the company conditional on no default occurring between an initial time and an observational time using a probability vector P.

BRIEF DESCRIPTION OF THE DRAWING FIGURES

These and other objects, features and advantages of the invention will be apparent from a consideration of the following detailed description of the invention when read in conjunction with the drawing figures, in which.

DETAILED DESCRIPTION OF THE INVENTION

The present invention is described below with respect to two embodiments. The first embodiment comprises a closed form solution with a jump that would bring a company value to 0. The second embodiment is more general, and can be used to analyze how a particular company can default in great detail. In both cases there are provided new and very efficient methods for solving the corresponding barrier pricing problem, calculating CDSs, etc. A process is then provided for solving the first and second embodiments on a computer.

For purposes of explanation, each equation is numbered with an identifying number to the far right. Further for purposes of explanation, a defined variable retains its initial definition unless it is expressly redefined elsewhere.

Closed Form Solution

As noted above, the closed form solution is a relatively straight-forward solution accommodating a value jump to zero. Specifically, it is assumed that the evolution of a company's value is governed by the SDE of the form:

$$\frac{dV}{V} = (r+\lambda)dt + \sigma dW - dN \tag{16}$$

In contrast to Merton's model equation (1), and Zhou's process equation (15), it is assumed that the value of the company either diffuses gradually, or jumps all the way to zero suddenly. This assumption allows the calculation of the relevant quantities in a straight-forward manner. Since the value of the company does not jump with probability $e^{-\lambda T}$ but jumps to zero with probability $1-e^{-\lambda T}$, equity S, and survival probability Q(t) are represented in the form:

$$S = VN(d_+) - e^{-(r+\lambda)T}DN(d_-) - V(LD/V)^{2(r+\lambda)/\sigma^2+1}N(f_+) + e^{-(r+\lambda)T}D(LD/V)^{2(r+\lambda)/\sigma^2-1}N(f_-) \tag{7}$$

$$Q(t) = e^{-\lambda T}[N(g_+) - (LD/V)^{2r/\sigma^2}N(g_-)]t<T \tag{18}$$

$$d_{\pm} = [\ln(S/D) + (r+\lambda\pm\sigma^2/2)T]/\sigma\sqrt{T} \tag{19}$$

$$f_{\pm} = [\ln(L^2D/V) + (r+\lambda\pm\sigma^2/2)T]/\sigma\sqrt{T} \tag{20}$$

$$g_{\pm} = [\pm\ln(V/LD) + (r+\lambda-\sigma^2/2)t]/\sigma\sqrt{t} \tag{21}$$

Where:
V is the value of the company,
r is the risk neutral rate,
$\sigma$ is the volatility of company's value,
$\lambda$ is the is the intensity of jump arrivals
D is the value of the Debt to be paid at time T, N is the standard Poisson process for determining the probability of an event in a time interval, N(.) is the cumulative normal distribution, T is the maturity of debt, L is the relative level of company liabilities, t is a time between 0 and T, the maturity of the debt, d± is a mathematical function defined by formula (19), ƒ± is a mathematical function defined by formula (20), g± is a mathematical function defined by formula (21).

By construction, CDS(t), which is given by formula (12), approaches $\lambda(1-R)$ when t approaches zero. Here R is the recovery level, which can be different for different seniorities of the debt.

Figure 1:
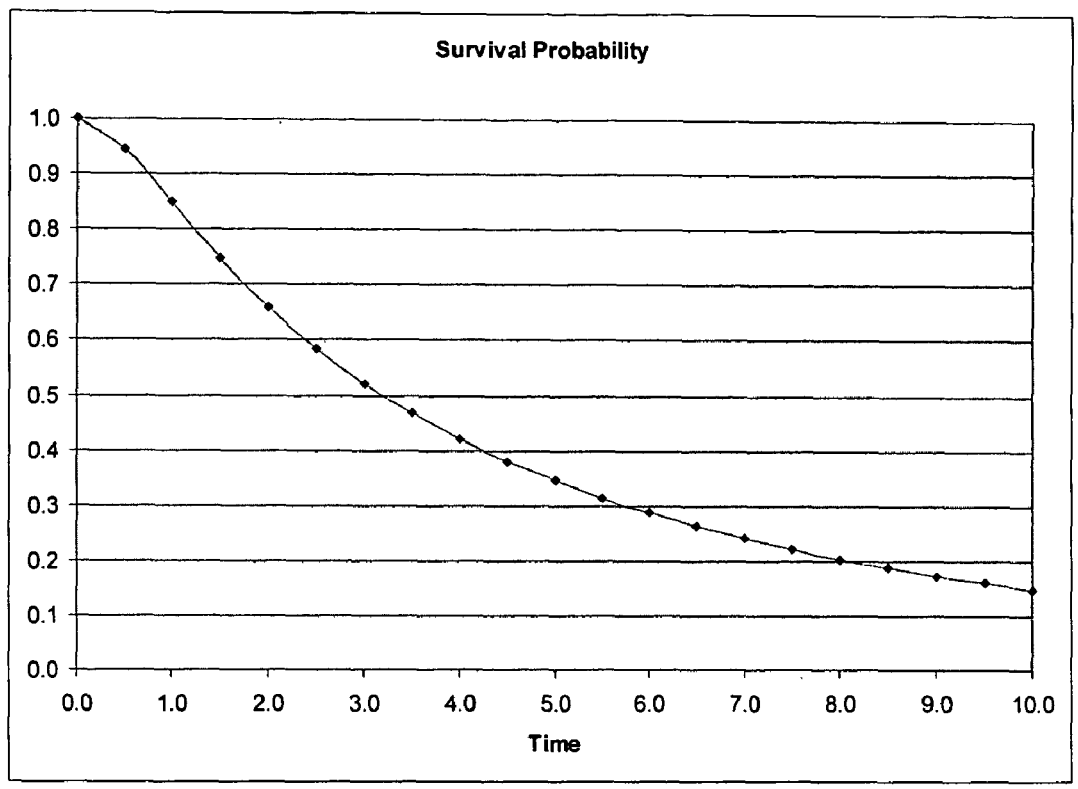
FIG. 1 is a plot showing survival probability versus time calculated using the closed form solution described below.
Figure 2:
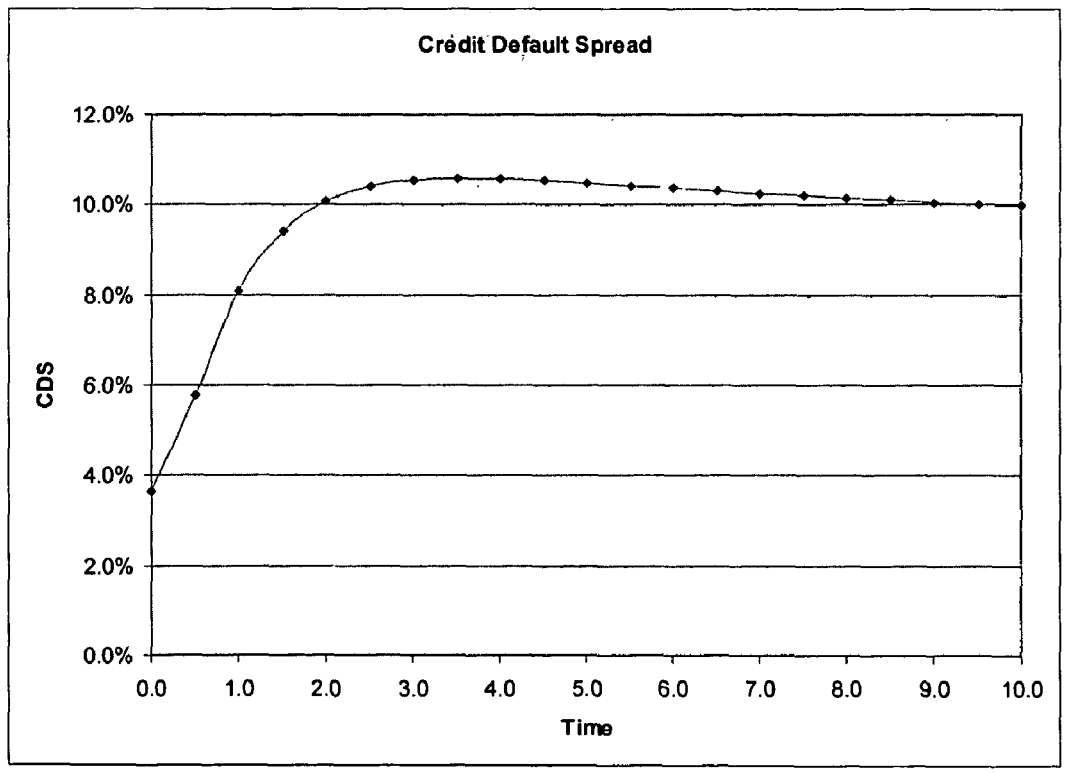
FIG. 2 is a plot showing credit defaults spread versus time calculated using the closed form solution described below.

With reference now to FIGS. 1 and 2, there is shown a survival probability versus time plot and a credit default spread versus time plot, respectively, for the closed form solution.

The relevant parameters for the plots are V=130, $\lambda$=0.1, r=0, $\sigma$=0.5, T=10, D=100, L=0.5, R=0.5.

As can be seen from a consideration of the plots, the relatively steep slope of the survival probability plot near time equal to 0 in FIG. 1, evidenced by the relatively high initial credit default spread of almost 4% at time equal to 0 in FIG. 2, is a relatively real-life result arising from the jumps introduced by the present invention. In contrast, the result provided by the prior art such as equations (9) and (12) described above typically yield no initial slope in the survival probability curve and a zero credit default spread near time equal to 0.

General Solution

This second embodiment of the invention is significantly more general than the closed form solution described above. In this embodiment it is assumed that the evolution of a company's value is given by equation (15) (set out again immediately below).

$$\frac{dV}{V} = (r - \lambda\kappa)dt + \sigma dW + (e^J - 1)dN \quad (15)$$

To be specific, we choose the lognormal distribution of jump sizes, so that J is a normal variable with mean j and standard deviation k. However, rather than assuming that the company defaults when V(t) crosses a flat barrier LD as Zhou did, it is assumed that the company defaults if at a sequence of discrete observational times $t_0=0$(today), $t_1, t_2, \ldots, t_N=T$ (maturity) the value of the company $V_n=V(t_n)$ falls below some barrier levels $B_1, B_2, \ldots, B_N=D$. Barrier levels represent different debt amounts, which come due at times $t_1, t_2, \ldots, t_N=T$(maturity). This flexibility allows the analysis of companies with different term structures of debt obligations and the analysis of their ability to meet their debt obligations in great detail. This embodiment of the invention allows for volatility, drift and other parameters characterizing the evolution of the value of the company to have a piece-wise constant term structure.

One key feature of the invention is the analysis that the transitional probability density function (TPDF) for the value of the company conditional on no default occurring between today and observational time t, can be computed very efficiently and quickly via the method of forward induction. There is first chosen the range for the natural logarithm of the value of the company U=ln(V):

$$U_{min} < U < U_{max} \quad (22)$$

where $$U_{min} = -nstdiv\sqrt{(\sigma^2 + k^2)T} + \min(r - \lambda\kappa - \sigma^2/2, 0)T \quad (23)$$

$$U_{max} = nstdiv\sqrt{(\sigma^2 + k^2)T} + \max(r - \lambda\kappa - \sigma^2/2, 0)T \quad (24)$$

Here nsd is the number of standard deviations, used to characterize the extreme values of the natural logarithm of the value of the company, typically chosen nsd to be 3 or 4 since the probability of this value to move outside of the chosen interval is negligible because of the well-known properties of the normal distribution. Next this range is divided into an equidistant grid $u_0=U_{min}, u_1, \ldots, u_m, \ldots, u_M=U_{max}$ of M steps, with grid step, denoted by h, equal to $h=(U_{max}-U_{min})/M$. For subsequent calculations to perform properly, it is required that the total number of points in the grid, which is equal to M+1, be a power of 2, for example, M=127, M=255, M=511, etc.

Next, there is defined the integer $\mu$=floor $(-U_{min}/h)$, where floor is a mathematical function, which for every number defines an integer less than or equal to that number. Next there is constructed the modified grid as follows: $\tilde{u}_m=(m-\mu)h$, m=0, 1, ..., M. Finally, there is defined a grid on the line representing the value of the company via the following formula:

$$v_m = V_0 \exp(u_m) m = 0, 1 \ldots, M. \quad (24A)$$

The initial value of the company $V_0$ is equal to $V_\mu$.

On the grid the probability that the company will have a value of $v_m$ at time $t_n$ is given by the vector $P_n=(P_{0,n}, \ldots, P_{m,n}, \ldots, P_{M,n})$. Initial vector $P_0=(0, \ldots, 1_{82}/h, \ldots, 0)$ where the only known zero element is in position mu, To move from the initial probability vector $P_0$ to the subsequent vector $P_1$, two operations are performed. First, there is computed the unconditional probability vector $\overline{P}_1$ given by the expression:

$$\overline{P}_1 = \hat{T}_{0,1} P_0 \quad (25)$$

Here $\hat{T}_{0,1}$ is the transition operator between the times $t_0$ and $t_1$ for the SDE (see equation 15).

Next, there is applied a projection operator $\hat{\Pi}_1$ to vector $\overline{P}_1$ in order to obtain the vector $P_1$:

$$P_1 = \hat{\Pi}_1 \overline{P}_1 \quad (26)$$

Matrix Multiplication Computational Solution

It will be understood that while the transition operator $\hat{T}_{0,1}$ is rather complicated to efficiently analyze, the projection operator $\hat{\Pi}_1$ acts on a given vector in a very simple way, that is, it replaces all the components with indices m, such that $v_m < B_1$, by zeroes. Basic application of the standard rules of matrix multiplication to calculate $\overline{P}_1$ requires $O(M^2)$ operations, where O(.) is the standard mathematical symbol which means "of order", which would typically make this operation computationally complex and expensive.

However, as we will be shown, the present invention provides a mathematically elegant shortcut, allowing the calculation of $\overline{P}_1$ by using O(M ln(M)) operations, thus providing orders of magnitude acceleration in speed in comparison to the standard solution. For instance, if M=127 the method provided by the present invention is approximately 20 times faster than the standard one.

In general, to calculate the company value probability vector $P_n$ it is necessary to perform a sequence of recursive operations starting with the initial vector $P_0$:

$$P_1 = \hat{\Pi}_1 \hat{T}_{0,1} P_0,$$

...

$$P_n = \hat{\Pi}_n \hat{T}_{n-1,n} P_{n-1},$$

...

$$P_N = \hat{\Pi}_{N-1,N} P_{N-1}, \quad (27)$$

Once all the vectors $P_n$, n=0, 1, ..., N, are found, survival probabilities can be simply calculated, and hence CDSs, equity and debt prices, recovery values, etc. by simple substitution of the vectors $P_n$ into the appropriate equations. For example, survival probability $Q_n$ is calculated as:

$$Q_n = \sum_{m=0}^{M} P_{m,n} \quad (28)$$

where
m is an index changing from 0 to M,
M is the total number of grid points,
n is an index changing from 0 to N, and
N is the total number of times when company value is observed.

Equity value S is calculated as:

$$S = e^{-rT} \sum_{m=0}^{M} P_{m,N} \max(v_m - B_N, 0) \quad (29)$$

where
r is the interest rate,
T is the maturity of debt,
m is an index changing from 0 to MA
$v_m$ represents the value of the company,
N is the total number of times when company value is observed,
M is the total number of grid points, and
$B_N$ is the terminal debt level.

where $v_m$=one of the possible values of the company at time T and the other values are as defined above.

The present value of company debt $\delta$ is calculated as:

$$\delta = e^{-rT} \sum_{m=0}^{M} P_{m,N} \quad (29A)$$

where
r is the interest rate,
T is the maturity of debt,
N is the total number of times when company value is observed,
m is an index changing from 0 to M, and
M is the total number of grid points.

and credit default spread CDS is calculated as:

$$CDS_n = (1-R)\left(\frac{1 - e^{-rt_n} Q_n}{1/2 e^{-rt_0}(t_1 - t_0) + \\ 1/2 \sum_{n'=1}^{n-1} e^{-rt_{n'}}(t_{n'+1} - t_{n'-1}) + \\ 1/2 e^{rt_n}(t_n - t_{n-1})} - r\right) \quad (29B)$$

more particularly, where $CDS_n$ is the credit default spread to time $t_n$ with $1 \leq n \leq N$, and n' is a dummy index, where
r is the interest rate,
$t_n$ is the observational time between today and maturity T,
R is a recovery level for a selected debt seniority,
n is an index changing from 1 to N, and
n' is an index changing from 1 to n−1.

Matrix elements of a typical projection operator $\hat{\Pi}_n$ are straight-forwardly expressed as $\rho_{pq}=1$ if p=q and $v_q \geq B_n$, $\rho_{pq}=0$ otherwise $\quad (30)$ Thus, a vector $y = \hat{\Pi}_n x$ is represented as follows $$\begin{pmatrix} y_0 \\ ... \\ y_m \\ ... \\ y_M \end{pmatrix} = \begin{pmatrix} 0 & ... & 0 & ... & 0 \\ ... & ... & ... & ... & ... \\ ... & ... & 1 & ... & ... \\ ... & ... & ... & ... & ... \\ 0 & ... & 0 & ... & 1 \end{pmatrix} \begin{pmatrix} x_0 \\ ... \\ x_m \\ ... \\ x_M \end{pmatrix} \quad (31)$$

or, explicitly, $y_p = x_p$ if $v_q \geq B_n$, $y_p = 0$ otherwise $\quad (32)$

Accordingly, multiplication by the projection operator is very straight-forward.

The transition operator is more complex. We can represent a typical element $\theta_{p,q}$ in the form:

$$\theta_{p,q} = \theta_{p,q}^{(0)} + \theta_{p,q}^{(1)} \quad (33)$$

where $$\theta_{p,q}^{(0)} = \frac{1}{1 + \lambda \Delta t} \frac{\exp\{-(v_q - v_p - (r - \lambda\kappa)\Delta t)^2 / 2\sigma^2 \Delta t\}}{\sqrt{2\pi\sigma^2 \Delta t}} \quad (34)$$

$$\theta_{p,q}^{(1)} = \frac{\lambda \Delta t}{1 + \lambda \Delta t} \frac{\exp\{-(v_q - v_p - (r - \lambda\kappa)\Delta t - j)^2 / 2(\sigma^2 \Delta t + k^2)\}}{\sqrt{2\pi(\sigma^2 \Delta t + k^2)}} \quad (35)$$

Here $\Delta t = t_n - t_{n-1}$. When writing equations (31), (32), we assume that no more that one jump can occur between the observation times, an assumption that is benign and can be dropped if the need occurs. Thus, a vector $y = \hat{T}_{n-1,n} x$ can be represented as follows $$\begin{pmatrix} y_0 \\ \cdots \\ y_m \\ \cdots \\ y_M \end{pmatrix} = \begin{pmatrix} \theta_{00} & \cdots & \theta_{0m} & \cdots & \theta_{0M} \\ \cdots & \cdots & \cdots & \cdots & \cdots \\ \cdots & \cdots & \theta_{mn} & \cdots & \cdots \\ \cdots & \cdots & \cdots & \cdots & \cdots \\ \theta_{M0} & \cdots & \theta_{Mm} & \cdots & \theta_{MM} \end{pmatrix} \begin{pmatrix} x_0 \\ \cdots \\ x_m \\ \cdots \\ x_M \end{pmatrix} \quad (36)$$

It is clear that $$\theta_{pq} = \theta_{p+1,q+1} \quad (37)$$

which means that the transition matrix, is a Toeplitz matrix, which has identical elements on each diagonal. Every Toeplitz matrix of size (M+1)x(M+1) can be uniquely represented by a vector of size 2(M+1)x1. For the transition matrix of interest, the corresponding vector, denoted by $\Theta$, has elements of the form:

$$\Theta_0 = \theta_{0,0}, \ldots, \Theta_m = \theta_{0,m}, \ldots, \Theta_M = \theta_{0,M},$$

$$\Theta_{M+1} = 0,$$

$$\Theta_{M+2} = \theta_{M,0}, \ldots, \Theta_{M+m} = \theta_{M-m,0}, \ldots, \Theta_{2M+1} = \theta_{1,0} \quad (38)$$

or, explicitly, $$\Theta = (\theta_{00}, \ldots, \theta_{0,m}, \ldots, \theta_{0,M}, 0, \theta_{M,0}, \ldots, \theta_{M-m,0}, \ldots, \theta_{1,0})^T \quad (39)$$

where the superscript T denotes the transpose. In order to perform the matrix multiplication efficiently, the Fast Fourier Transform (FFT) method is applied. This method is well known in the art. For example, Press et al. describe this method in great detail. The (M+1)x1 probability density vector P is augmented with zeroes in order to increase its length to 2(M+1)x1, and the extended vector denoted as $\tilde{P}$, so that $$\tilde{P} = (P_0, \ldots, P_m, \ldots, P_M, 0, \ldots, 0 \ldots, 0)^T \quad (40)$$

The convolution theorem is applied to show that the vector $\hat{T}P$ is equal to the first (M+1) components of the vector obtained via the following procedure:

$$F^{-1}\{F\{\Theta\} * F\{\tilde{P}\}\} \quad (41)$$

where F and $F^{-1}$ denote the direct and inverse FFT, respectively, and * denotes the component-wise multiplication of vectors. It is well-known that an individual FFT requires O(Mln(M)) operations, and so does the entire matrix multiplication.

It will be appreciated that, in accordance with the above-described matrix computational solution, the above-described processes can be implemented in a straight-forward manner on a conventional computer. For example, a personal computer, workstation or mainframe, using a conventional software program, for example Fortran, C++, or even a conventional spreadsheet such as Microsoft Excel™.

Figure 3:
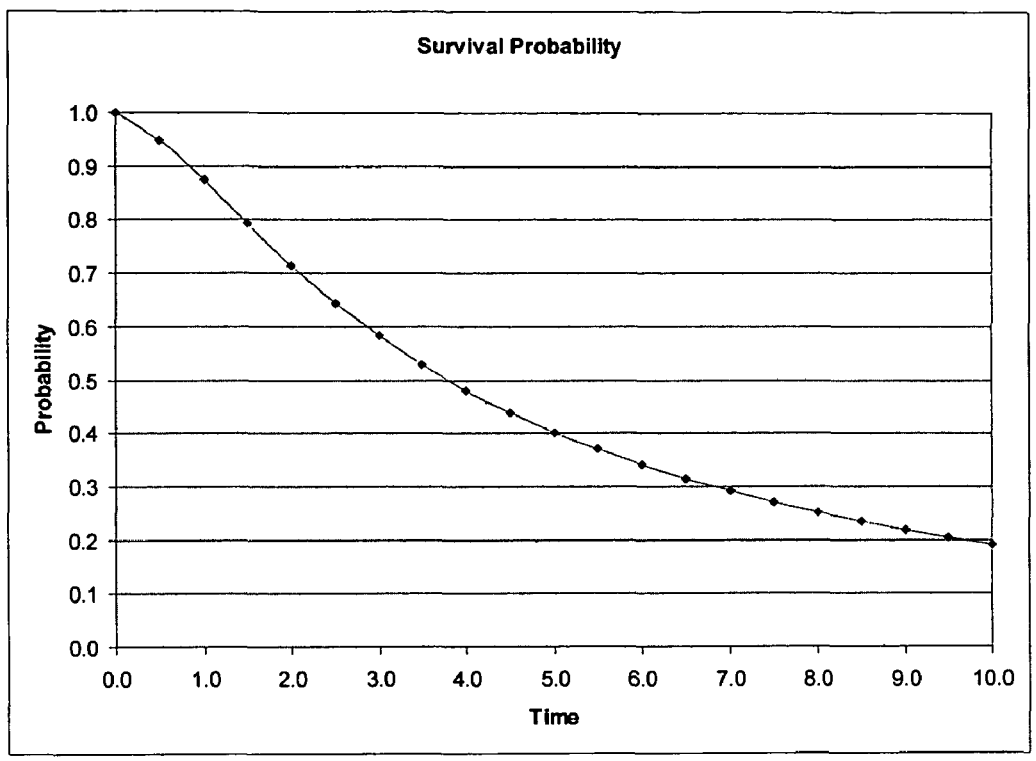
FIG. 3 is a plot showing survival probability versus time calculated using the general solution described below.
Figure 4:
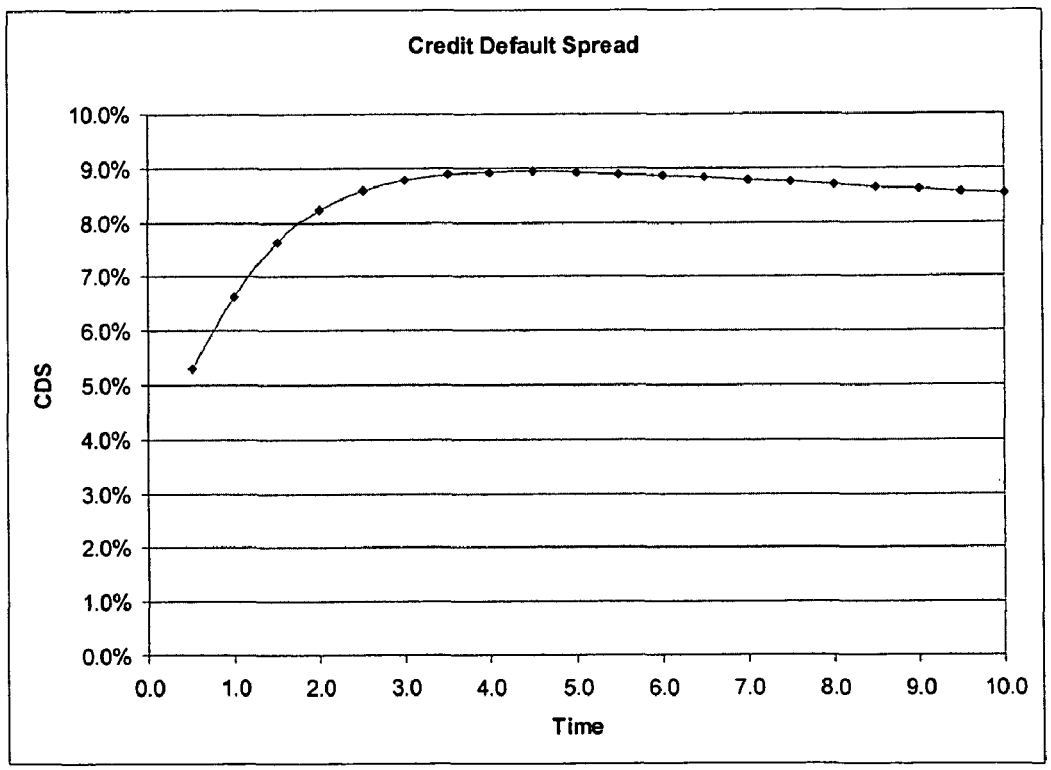
FIG. 4 is a plot showing credit default spread versus time calculated using the general solution described below.

With reference now to FIGS. 3 and 4, there is shown a survival probability versus time plot and a credit default spread versus time plot, respectively, for the general solution.

The relevant parameters are V=130, $\lambda$=0.1, j=−2, k0, r=0, $\sigma$=0.5, T=10, D=100, L=0.5, R=0.5, N=20, nsd=4.

As can be seen from a consideration of the plots, the relatively steep slope of the survival probability plot near time equal to 0 in FIG. 3, evidenced by the relatively high initial credit default spread of over 5% near time equal to 0 in FIG. 4, is a relatively real-life result arising from the jumps introduced by the present invention. In contrast, as noted above, the result provided by the prior art such as equations (9) and (12) described above typically yield no initial slope in the survival probability curve and a zero credit default spread near time equal to 0.

There have thus been shown and described new structural default models for modeling the likely default of publicly traded companies. In a first embodiment, the invention is straight-forward to implement and allows the capture of some important ingredients of the actual default, including positive short-term CDSs. This embodiment can be viewed as a hybrid between a structural and a reduced form model. A second embodiment is somewhat more versatile and complex. It provides a very efficient method, which is by far superior to the Monte Carlo method, for dealing with the term structure of a default boundary, jumps in the company's value, etc. This second embodiment enables the deep analysis of the term structure of the debt obligations of a given company, and the company's ability to pay back its debt. Further provided is a process using Fast Fourier Transform matrix processing for processing the structural default models in a computationally efficient manner.

While the invention has been shown and described with respect to specific embodiments, it is not thus limited. Numerous changes, modifications and improvements within the scope of the invention will now be apparent to the reader.

What is claimed is:

1. A method for calculating the financial status of a company, comprising the steps of:

calculating, using a computer, a value of the company in accordance with a formula $$\frac{dV}{V} = (r + \lambda)dt + \sigma dW - dN$$

wherein
V is the value of the company,
r is an interest rate,
$\lambda$ is an intensity of a jump arrival,
$\sigma$ is a volatility of the company,
N is a standard Poisson process,
W is a standard Wiener process,
and t is a time between 0 and T, T being a maturity of a debt; and using the value of the company to calculate, using the computer, a financial metric for the company.

2. The method of claim 1, wherein the financial metric is an equity value of the company calculated in accordance with a formula $$S = VN(d_+) - e^{-(r+\lambda)T}DN(d_-) - V(LD/V)^{2(r+\lambda)/\sigma^2+1}N(f_+) + e^{-(r+\lambda)T}D(LD/V)^{2(r+\lambda)/\sigma^2-1}N(f_-)$$

wherein like variables to those defined above define the same values, and
wherein $$d_\pm = [\ln(S/D) + (r + \lambda \pm \sigma^2/2)T]/\sigma\sqrt{T}$$

$$f_\pm = [\ln(L^2D/V) + (r + \lambda \pm \sigma^2/2)T]$$

D is a value of the debt,
T is the maturity of the debt, and
L is a relative level at which the company defaults.

3. The method of claim 1, wherein the financial metric is a debt value of the company in accordance with a formula $$\delta = VN(d_-) + e^{-(r+\lambda)T}DN(d_-) + V(LD/V)^{2(r+\lambda)/\sigma^2+1}N(\theta_+) - e^{-(r+\lambda)T}D(LD/V)^{2(r+\lambda)/\sigma^2-1}N(f_-)$$

wherein like variables to those defined above define the same values, and wherein $$d_{\pm}=[\ln(S/D)+(r+\lambda\pm\sigma^2/2)T]/\sigma\sqrt{T}$$

$$f_{\pm}=[\ln(L^2D/V)+(r+\lambda\pm\sigma^2/2)T]/\sigma\sqrt{T}$$

D is the value of the debt,
T is the maturity of the debt, and
L is a relative level at which the company defaults.

4. The method of claim 1, wherein the financial metric is a survival probability of the company in accordance with a formula $$Q(t)=e^{-\lambda T}[N(g_+)-(LD/V)^{2r/\sigma^2}N(g_-)], t<T$$

wherein like variables to those defined above define the same values, and wherein $$g_{\pm}=[\pm\ln(V/LD)+(r+\lambda-\sigma^2/2)t]/\sigma\sqrt{t}$$

D is a value of the debt,
T is the maturity of debt,
L is a relative level at which the company defaults.

5. The method of claim 1, further comprising the step of calculating a credit default spread (CDS(t)) for very short maturities of the company in accordance with a formula $$CDS(t)\rightarrow\lambda(1-R) \text{ when } t\rightarrow 0,$$

wherein R is a recovery level for a selected debt seniority.

6. A system for calculating the financial status of a company, comprising:
a processor; and
a memory connected to the processor and storing instructions for controlling the operation of the processor, the processor operative with the instructions in the memory to perform the steps of:
calculating a value of the company in accordance with a formula $$\frac{dV}{V}=(r+\lambda)dt+\sigma dW-dN$$

wherein
V is the value of the company,
r is an interest rate,
λ is an intensity of a jump arrival,
σ is a volatility of the company,
N is a standard Poisson process,
W is a standard Wiener process,
and t is a time between 0 and T, T being a maturity of a debt; and
using the value of the company to calculate a financial metric for the company.

7. The system of claim 6, wherein the financial metric is an equity value of the company in accordance with a formula $$S=VN(d_+)-e^{-(r+\lambda)T}DN(d_-)-V(LD/V)^{2(r+\lambda)/\sigma^2+1}N(f_+)+e^{-(r+\lambda)T}D(LD/V)^{2(r+\lambda)/\sigma^2-1}N(f_-)$$

wherein like variables to those defined above define the same values, and wherein $$d_{\pm}=[\ln(S/D)+(r+\lambda\pm\sigma^2/2)T]/\sigma\sqrt{T}$$

$$f_{\pm}=[\ln(L^2D/V)+(r+\lambda\pm\sigma^2/2)T]/\sigma\sqrt{T}$$

D is a value of the debt,
T is the maturity of the debt, and
L is a relative level at which the company defaults.

8. The system of claim 6, wherein the financial metric is a debt value of the company in accordance with a formula $$\delta=VN(d_-)+e^{-(r+\lambda)T}DN(d_-)+V(LD/V)^{2(r+\lambda)/\sigma^2+1}N(f_+)-e^{-(r+\lambda)T}D(LD/V)^{2(r+\lambda)/\sigma^2-1}N(f_-)$$

wherein like variables to those defined above define the same values, and wherein $$d_{\pm}=[\ln(S/D)+(r+\lambda\pm\sigma^2/2)T]/\sigma\sqrt{T}$$

$$f_{\pm}=[\ln(L^2D/V)+(r+\lambda\pm\sigma^2/2)T]/\sigma\sqrt{T}$$

D is a value of the debt,
T is the maturity of the debt, and
L is a relative level at which the company defaults.

9. The system of claim 6, wherein the financial metric is a survival probability of the company in accordance with a formula $$Q(t)=e^{-\lambda T}[N(g_+)-(LD/V)^{2r/\sigma^2}N(g_-)], t<T$$

wherein like variables to those defined above define the same values, and wherein $$g_{\pm}=[\pm\ln(V/LD)+(r+\lambda-\sigma^2/2)t]/\sigma\sqrt{t}$$

D is a value of the debt,
T is the maturity of debt,
L is a relative level at which the company defaults.

10. The system of claim 6, wherein the processor is further operative with the instructions in the memory to perform the step of calculating a credit default spread (CDS(t)) for very short maturities of the company in accordance with a formula $$CDS(t)\rightarrow\lambda(1-R) \text{ when } t\rightarrow 0,$$

wherein R is a recovery level for a selected debt seniority.

11. A system for calculating a financial status of a company, comprising:
means for calculating a value of the company in accordance with a formula $$\frac{dV}{V}=(r+\lambda)dt+\sigma dW-dN$$

wherein
V is the value of the company,
r is an interest rate,
λ is an intensity of jump arrivals,
σ is a volatility of the company,
N is a standard Poisson process,
W is a standard Wiener process,
and t is a time between 0 and T, T being a maturity of a debt; and
means for using the value of the company to calculate a financial metric for the company.

12. The system of claim 11, wherein the financial metric is an equity value of the company in accordance with the formula $$S=VN(d_+)-e^{-(r+\lambda)T}DN(d_-)-V(LD/V)^{2(r+\lambda)/\sigma^2+1}N(f_+)+e^{-(r+\lambda)T}D(LD/V)^{2(r+\lambda)/\sigma^2-1}N(f_-)$$

wherein like variables to those defined above define the same values, and wherein $$d_{\pm}=[\ln(S/D)+(r+\lambda\pm\sigma^2/2)T]/\sigma\sqrt{T}$$

$$f_{\pm}=[\ln(L^2D/V)+(r+\lambda\pm\sigma^2/2)T]/\sigma\sqrt{T}$$

D is a value of the debt,
T is the maturity of the debt, and
L is a relative level at which the company defaults.

13. The system of claim 11, wherein the financial metric is a debt value of the company in accordance with the formula $$\delta=VN(d_-)+e^{-(r+\lambda)T}DN(d_-)+V(LD/V)^{2(r+\lambda)/\sigma^2+1}N(f_+)-e^{-(r+\lambda)T}D(LD/V)^{2(r+\lambda)/\sigma^2-1}N(f_-)$$

wherein like variables to those defined above define the same values, and
wherein $$d_{\pm}=[\ln(S/D)+(r+\lambda\pm\sigma^2/2)T]/\sigma\sqrt{T}$$

$$f_{\pm}=[\ln(L^2D/V)+(r+\lambda\pm\sigma^2/2)T]/\sigma\sqrt{T}$$

D is a value of the debt,
T is the maturity of the debt, and
L is a relative level at which the company defaults.

14. The system of claim 11, wherein the financial metric is a survival probability of the company in accordance with the formula $$Q(t)=e^{-\lambda T}[N(g_+)-(LD/V)^{2r/\sigma^2}N(g_-)], t<T$$

wherein like variables to those defined above define the same values, and
wherein $$g_{\pm}=[\pm\ln(V/LD)+(r+\lambda-\sigma^2/2)t]/\sigma\sqrt{t}$$

D is a value of the debt,
T is the maturity of the debt,
L is a relative level at which the company defaults.

15. The system of claim 11, further comprising means for calculating a credit default spread (CDS(t)) for very short maturities of the company in accordance with the formula $$CDS(t)\rightarrow\lambda(1-R) \text{ when } t\rightarrow 0,$$

wherein R is a recovery level for a selected debt seniority.

* * * * *